(12) United States Patent
Montero et al.

(10) Patent No.: US 11,809,261 B2
(45) Date of Patent: Nov. 7, 2023

(54) SYSTEMS AND METHODS FOR ITEMIZING DEVICE INVENTORY FOR SYSTEM POWER MANAGEMENT

(71) Applicant: Dell Products L.P., Round Rock, TX (US)

(72) Inventors: Adolfo S. Montero, Pflugerville, TX (US); Keith Lambright, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/192,073

(22) Filed: Mar. 4, 2021

(65) Prior Publication Data
US 2022/0283628 A1  Sep. 8, 2022

(51) Int. Cl.
*G06F 1/26*     (2006.01)
*G06F 1/32*     (2019.01)
*G06F 1/3296*   (2019.01)
*G06F 1/28*     (2006.01)

(52) U.S. Cl.
CPC .............. *G06F 1/3296* (2013.01); *G06F 1/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,719,800 | A * | 2/1998 | Mittal | G06F 1/32 713/321 |
| 6,438,007 | B1 * | 8/2002 | Pilukaitis | H02M 7/08 363/65 |
| 7,475,175 | B2 * | 1/2009 | Klein | G06F 15/0216 257/706 |
| 2003/0169059 | A1 * | 9/2003 | Bodenstab | G06F 30/367 324/713 |
| 2004/0225821 | A1 * | 11/2004 | Klein | G06F 15/7864 710/306 |
| 2007/0050646 | A1 * | 3/2007 | Conroy | G06F 1/3287 713/300 |
| 2010/0125436 | A1 * | 5/2010 | Chase | G06F 11/24 702/186 |
| 2012/0127761 | A1 * | 5/2012 | Halberstadt | H02M 3/33571 363/21.02 |

(Continued)

*Primary Examiner* — Mohammed H Rehman
(74) *Attorney, Agent, or Firm* — Jackson Walker L.L.P

(57) ABSTRACT

An information handling system may include a processor, a plurality of information handling resources communicatively coupled to the processor, a power subsystem configured to deliver electrical energy to the processor and the plurality of information handling resources to enable operation of the processor and the plurality of information handling resources and a management controller. The management controller may be configured to create an inventory of the plurality of information handling resources; based on the inventory, determine a worst-case maximum power consumption of the processor and the plurality of information handling resources; determine if the worst-case maximum power consumption exceeds a power limit associated with the power subsystem; and if the worst-case maximum power consumption exceeds the power limit, cause a remedial action to be taken to maintain power consumption of the processor and the plurality of information handling resources below the power limit.

18 Claims, 2 Drawing Sheets

(56) References Cited

U.S. PATENT DOCUMENTS

| | | | |
|---|---|---|---|
| 2013/0031378 A1* | 1/2013 | Schindler | G06F 1/266 |
| | | | 713/300 |
| 2013/0035797 A1* | 2/2013 | Allen-Ware | G06F 1/324 |
| | | | 700/286 |
| 2014/0067139 A1* | 3/2014 | Berke | G06F 1/3287 |
| | | | 700/291 |
| 2014/0095903 A1* | 4/2014 | Muccini | G06F 1/263 |
| | | | 713/320 |
| 2014/0157021 A1* | 6/2014 | Varma | G06F 1/3234 |
| | | | 713/321 |
| 2014/0337646 A1* | 11/2014 | Varma | G06F 1/324 |
| | | | 713/322 |
| 2017/0307666 A1* | 10/2017 | Alley | G01R 22/04 |
| 2018/0364794 A1* | 12/2018 | Yi | H03K 17/951 |
| 2019/0016165 A1* | 1/2019 | Aoki | G03G 21/00 |

\* cited by examiner

|  | COUNT OR SETTING | CONTINUOUS (CPU PL1) | 24 SEC (CPU PL2) | 10 ms (CPU PL4) |
|---|---|---|---|---|
| BASE (EXCLUDES BELOW) | N/A | 55 | 55 | 55 |
| CPU | 1 OF 1 | 65 | 250 | 350 |
| GRAPHICS PCIe SLOTS | 1 OF 1 | 110 | 110 | 110 |
| NON-GRAPHICS PCIe SLOTS | 2 OF 3 | | | |
| HDDs | 3 OF 4 | 9 | 9 | 9 |
| M.2 SSDs | 2 OF 3 | 5 | 5 | 5 |
| MEMORY DIMMs | 4 OF 4 | 10 | 10 | 10 |
| #1 TYPE C PORT CONTRACT | MAX, IN USE | 15 | 15 | 15 |
| #2 TYPE C PORT CONTRACT | MAX, IN USE | 15 | 15 | 15 |
| TYPE A BC 1.2 PORT SETTING | MAX, IN USE | 10 | 10 | 10 |
| SYSTEM MAX POWER |  | 294 | 479 | 579 |
| PSU LIMIT |  | 300 | 450 | 600 |

FIG. 2

|  | COUNT OR SETTING | CONTINUOUS (CPU PL1) | 24 SEC (CPU PL2) | 10 ms (CPU PL4) |
|---|---|---|---|---|
| BASE (EXCLUDES BELOW) | N/A | 55 | 55 | 55 |
| CPU | 1 OF 1 | 65 | 250 | 350 |
| GRAPHICS PCIe SLOTS | 1 OF 1 | 120 | 120 | 120 |
| NON-GRAPHICS PCIe SLOTS | 3 OF 3 | | | |
| HDDs | 3 OF 4 | 9 | 9 | 9 |
| M.2 SSDs | 2 OF 3 | 5 | 5 | 5 |
| MEMORY DIMMs | 4 OF 4 | 10 | 10 | 10 |
| #1 TYPE C PORT CONTRACT | MAX, IN USE | 15 | 15 | 15 |
| #2 TYPE C PORT CONTRACT | MAX, NO USE | 15 | 15 | 15 |
| TYPE A BC 1.2 PORT SETTING | MAX, IN USE | 10 | 10 | 10 |
| CALCULATED SYSTEM MAX POWER |  | 304 | 489 | 589 |
| PSU LIMIT |  | 300 | 450 | 600 |

FIG. 3

SYSTEMS AND METHODS FOR ITEMIZING DEVICE INVENTORY FOR SYSTEM POWER MANAGEMENT

TECHNICAL FIELD

The present disclosure relates in general to information handling systems, and more particularly to methods and systems for itemizing device inventory in an information handling system for system power management.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Internal information handling system components as well as externally-coupled components (e.g., Universal Serial Bus devices) are increasingly requiring greater electrical power demands. Accordingly, it has become increasingly common that tradeoffs are made between power supply costs and information handling system performance such that it is not necessary to design power supplies to meet the absolute worst-case system loading with every possible electrical load of a system populated and operating at full power consumption. Accordingly, substantial costs savings may be associated with not oversizing a power supply rating for absolute worst case conditions. However, when using an undersized power supply at worst-case conditions, undesirable "dirty" shutdown of an information handling system may occur.

For information handling systems allowing for user-installed components, such as Peripheral Component Interconnect (PCI) and Peripheral Component Interconnect Express (PCIe) devices, such components may have a very significant contribution to total system power loads, and may quite often be components that cause a power budget of an information handling system to exceed power supply ratings, thus risking undesirable "dirty" shutdown of an information handling system.

SUMMARY

In accordance with the teachings of the present disclosure, the disadvantages and problems associated with power management in an information handling system may be reduced or eliminated.

In accordance with embodiments of the present disclosure, an information handling system may include a processor, a plurality of information handling resources communicatively coupled to the processor, a power subsystem configured to deliver electrical energy to the processor and the plurality of information handling resources to enable operation of the processor and the plurality of information handling resources and a management controller. The management controller may be configured to create an inventory of the plurality of information handling resources; based on the inventory, determine a worst-case maximum power consumption of the processor and the plurality of information handling resources; determine if the worst-case maximum power consumption exceeds a power limit associated with the power subsystem; and if the worst-case maximum power consumption exceeds the power limit, cause a remedial action to be taken to maintain power consumption of the processor and the plurality of information handling resources below the power limit.

In accordance with these and other embodiments of the present disclosure, a method may include creating an inventory of a plurality of information handling resources integral to an information handling system, based on the inventory, determining a worst-case maximum power consumption of a processor integral to the information handling system and the plurality of information handling resources, determining if the worst-case maximum power consumption exceeds a power limit associated with a power subsystem integral to the information handling system, and if the worst-case maximum power consumption exceeds the power limit, causing a remedial action to be taken to maintain power consumption of the processor and the plurality of information handling resources below the power limit.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to: create an inventory of a plurality of information handling resources integral to an information handling system; based on the inventory, determine a worst-case maximum power consumption of a processor integral to the information handling system and the plurality of information handling resources; determine if the worst-case maximum power consumption exceeds a power limit associated with a power subsystem integral to the information handling system; and if the worst-case maximum power consumption exceeds the power limit, cause a remedial action to be taken to maintain power consumption of the processor and the plurality of information handling resources below the power limit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a table of example power requirements of a particular configuration of an information handling system, in accordance with embodiments of the present disclosure; and FIG. 3 illustrates a table of example power requirements of another particular configuration of an information handling system, in accordance with embodiments of the present disclosure.

DETAILED DESCRIPTION

Figure 1:
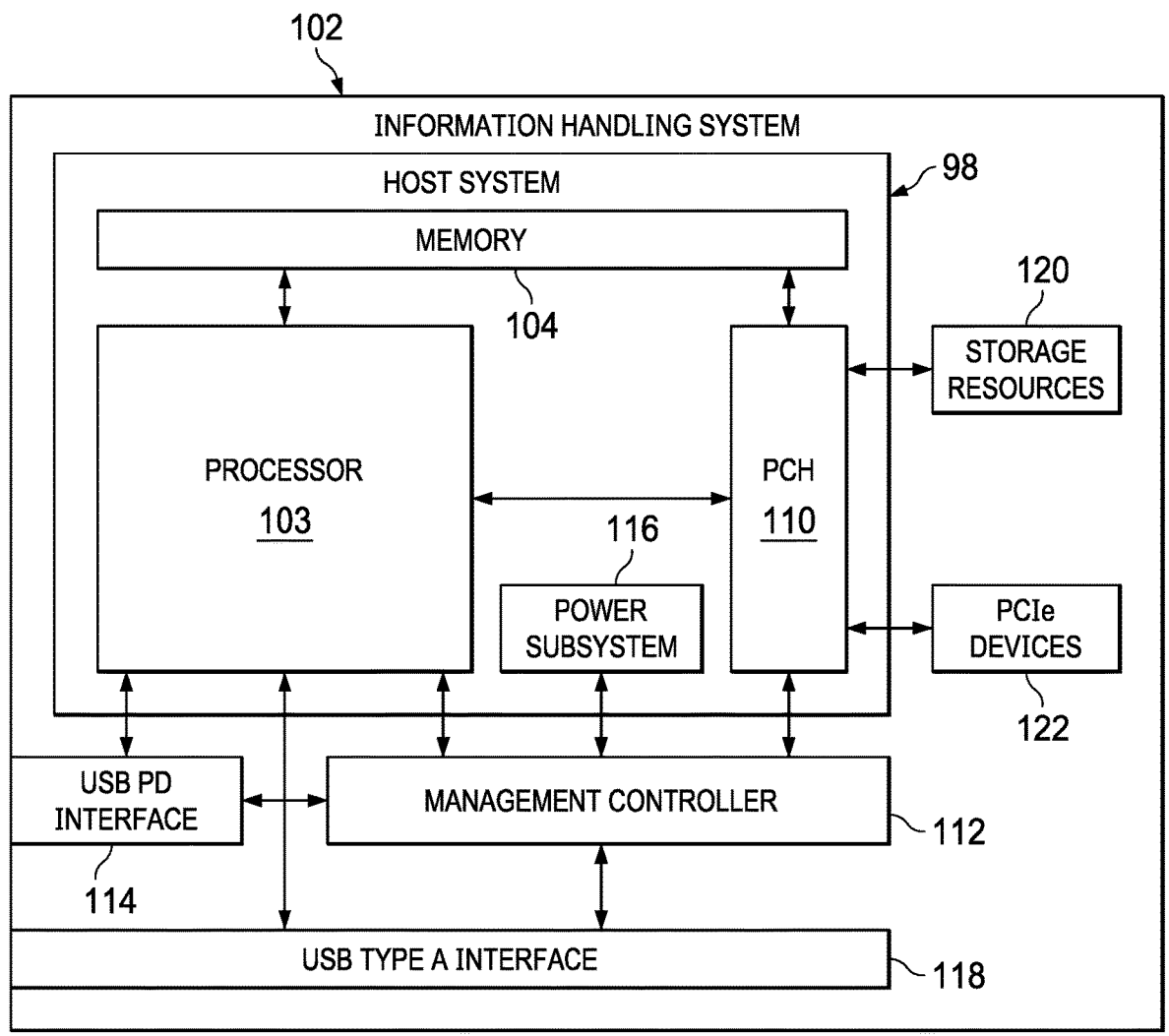
FIG. 1 illustrates a block diagram of an example information handling system, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.).

As depicted in FIG. 1, information handling system 102 may include a processor 103, a management controller 112 communicatively coupled to processor 103, a platform controller hub (PCH) 110 communicatively coupled to processor 103 and management controller 112, a memory 104 communicatively coupled to processor 103 via PCH 110, a Universal Serial Bus (USB) Power Delivery (PD) interface 114 communicatively coupled to processor 103 and management controller 112, a USB Type A interface 118 communicatively coupled to processor 103 and management controller 112, a power subsystem 116 communicatively coupled to management controller 112, one or more storage resources 120 communicatively coupled to processor 103 via PCH 110, and one or more PCIe devices 122 communicatively coupled to processor 103 via PCH 110. In operation, processor 103, memory 104, and PCH 110 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Management controller 112 may be configured to provide management facilities for management of information handling system 102. Such management may be made by management controller 112 even if information handling system 102 is powered off or powered to a standby state. Management controller 112 may include a processor, a memory, and or other components, such as USB PD interface 114. In certain embodiments, management controller 112 may include or may be an integral part of an embedded controller (EC), baseboard management controller (BMC), or a remote access controller (e.g., a Dell Remote Access Controller or Integrated Dell Remote Access Controller). In some embodiments, management controller 112 may be communicatively coupled to processor 103 via a Platform Environment Control Interface (PECI).

PCH 110 may be any system, device, or apparatus configured to control certain data paths (e.g., data flow between processor 103, memory 104, and peripherals) and support certain functions of processor 103. A PCH 110 may also be known as a "chipset" of an information handling system 102. For example, one such function may include implementing a management engine. A management engine may comprise hardware and/or firmware that enables remote out-of-band management for information handling system 102 in order to monitor, maintain, update, upgrade, and/or repair information handling system 102. In some embodiments, PCH 110 may be communicatively coupled to management controller 112 via an extended Serial Peripheral Interface (eSPI).

USB PD interface 114 may comprise any suitable system, device, or apparatus configured to serve as a cable interface in accordance with the USB PD specification. Although FIG. 1 depicts a USB PD interface 114, in some embodiments, an analogous data communication interface in accordance with a different communication standard may be used. In these and other embodiments, USB PD interface 114 may be communicatively coupled to management controller 112 via an Inter-Integrated Circuit (I2C) communications bus.

USB Type A interface 118 may comprise any suitable system, device, or apparatus configured to serve as a cable interface in accordance with the USB Type A specification. Although FIG. 1 depicts a USB Type A interface 118, in some embodiments, an analogous data communication interface in accordance with a different communication standard may be used. In these and other embodiments, USB Type A interface 118 may be communicatively coupled to management controller 112 via an I2C communications bus.

Power subsystem 116 may comprise any suitable system, device, or apparatus configured to deliver electrical energy to one or more components of information handling system 102 in order to allow such components to function. Accordingly, power subsystem 116 may include any suitable combination and number of power supply units, energy storage devices (e.g., batteries), regulators, and electrical conduits (e.g., wires, traces). In some embodiments, power subsystem 116 may be communicatively coupled to management controller 112 via an interface that allows power subsystem 116 to communicate one or more power system identifiers (PSIDs) to management controller 112.

A storage resource 120 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 120 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 120 internal to information handling system 102, in some embodiments, storage resource 120 may be external to information handling system 102 (e.g., embodied by a physical array of external hard disk drives).

A PCIe device 122 may be communicatively coupled to processor 103 via PCH 110 and may generally include any information handling resource. In some embodiments, one or more PCIe devices 122 may be coupled to processor 103 via a PCIe interface.

In addition to processor 103, memory 104, management controller 112, PCH 110, USB PD interface 114, USB Type A interface 118, power subsystem 116, storage resources 120, and PCIe devices 122, information handling system 102 may include one or more other information handling resources.

In operation, management controller 112 may, alone or in combination with a basic input/output system of information handling system 102, inventory PCIe devices 122 populated within information handling system 102 and compute a maximum power budget required to satisfy the PCIe devices 122. Management controller 112 may also combine such loading information of PCIe devices 122 with external port loading information (e.g., loading of devices coupled to USB PD interface 114 and USB Type A interface 118) and/or memory 104 based on the configuration of memory 104, in order to determine a maximum power budget of information handling system 102 in its current configuration.

To protect power subsystem 116 from overcurrent conditions, management controller 112 may provide a context to reduce power consumption of processor 103 (e.g., via PECI) when a risk exists that a total system power of information handling system 102 may exceed the maximum power rating of power subsystem 116. Accordingly, management controller 112 may determine if the worst case power budget for its current configuration is capable of exceeding the power supply rating of power subsystem 116. If so, management controller 112 may reduce one or more power caps of information handling system 102 to ensure that information handling system 102 in such a worst case configuration will not be capable of causing a dirty shutdown of information handling system 102 due to exceeding the maximum power delivery specification of power subsystem 116. In some embodiments, management controller 112 may also provide a context to reduce power consumption of other system components such as USB PD interface 114, USB Type A interface 118, a graphics card (not shown) via throttling, and/or any other suitable component of information handling system 102.

FIG. 2 illustrates a table of example power requirements of a particular configuration of information handling system 102, in accordance with embodiments of the present disclosure. As shown in FIG. 2, management controller 112 may inventory components of information handling system 102 and their respective maximum power requirements, including maximum power requirements of processor 103 ("CPU" in the table), PCIe devices 122 ("graphics PCIe slots," "non-graphics PCIe slots"), storage resources 120 ("HDDs", "M.2 SSDs"), memory 104 ("memory DIMMs"), USB PD interface 114 ("#1 Type C Port Contract", "#2 Type C Port Contract"), and USB Type A interface 118 ("Type A BC 1.2 Port Setting") for different periods of time: continuous, turbo (e.g., two or more seconds, and 24 seconds in a particular embodiment), and burst (e.g., 100 milliseconds or less, and 10 milliseconds in a particular embodiment). Based on these power requirements, management controller 112 may determine a system maximum power ("Sys Max Power") of information handling system 102 with respect to continuous operation, turbo operation, and burst operation, respectively. Further, management controller 112 may compare these values of system maximum power to power limits of power subsystem 116 associated with continuous operation (power limit 1 or "PL1"), turbo operation (power limit 2 or "PL2"), and burst operation (power limit 4 or "PL4"). If any system maximum power exceeds a respective power limit, management controller 112 may take remedial action to ensure maximum power consumption of information handling system remains below such respective power limit. For example, in the table of FIG. 2, the system maximum power for turbo operation exceeds power limit 2 for turbo operation by 29 watts. Accordingly, management controller 112 may take a remedial action to effectively maintain system maximum power in turbo operation below power limit 2, for example by reducing power consumption of processor 103 (e.g., by throttling operation) during turbo operation by 29 watts or more. In some embodiments, management controller 112 may reduce power consumed by USB PD interface 114 or USB Type A interface 118, but such reduction in power may be less desirable because the reduction of power of processor 103 in turbo operation may have minimal effect on performance.

FIG. 3 illustrates a table of example power requirements of another particular configuration of an information handling system, in accordance with embodiments of the present disclosure. In the example configuration of FIG. 3, the system maximum power for continuous operation exceeds power limit 1 for continuous operation by four watts and the system maximum power for turbo operation exceeds power limit 2 for turbo operation by 39 watts. Accordingly, management controller 112 may take a remedial action to effectively maintain system maximum power in continuous operation below power limit 1 and turbo operation below power limit 2, for example by reducing power consumption of processor 103 (e.g., by throttling operation) during turbo operation by 32 watts or more and reducing the #2 Type C port contract from 15 watts to 7.5 watts (which will reduce maximum power consumption by 7.5 watts across continuous, turbo, and burst operation), given that such port is indicated as not in use. Alternatively, management controller 112 may reduce power consumed by processor 103 by four watts in continuous operation and by 39 watts in turbo operation, but throttling of processor 103 in continuous operation may be undesirable and thus less preferable than reducing the power contract of a Type C port which is not in use.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    a plurality of information handling resources communicatively coupled to the processor;
    a power subsystem configured to deliver electrical energy to the processor and the plurality of information handling resources to enable operation of the processor and the plurality of information handling resources; and
    a management controller configured to:
        create an inventory of the plurality of information handling resources;
        based on the inventory, determine a worst-case maximum power consumption of the processor and the plurality of information handling resources;
        determine if the worst-case maximum power consumption exceeds a power limit associated with the power subsystem; and
        if the worst-case maximum power consumption exceeds the power limit, cause a remedial action to be taken to maintain power consumption of the processor and the plurality of information handling resources below the power limit;
    wherein the at least one of the plurality of information handling resources comprises a Universal Serial Bus Power Delivery (USB PD) interface; and
    the remedial action comprises at least one of:
        reducing a power contract associated with the USB PD interface; and
        reducing power consumption of the processor;
    wherein causing the remedial action to be taken includes preferentially reducing power consumption of the processor responsive to determining that the worst-case maximum power consumption only exceeds a corresponding power limit during a turbo operation of the processor and the plurality of information handling resources over a plurality of seconds.

2. The information handling system of claim 1, wherein the remedial action comprises preferentially reducing power consumption of the USB PD interface responsive to determining the USB PD interface is not in use.

3. The information handling system of claim 1, wherein the remedial action further comprises reducing power consumption of at least one other of the plurality of information handling resources.

4. The information handling system of claim 1, wherein the worst-case power consumption is associated with a continuous operation of the processor and the plurality of information handling resources.

5. The information handling system of claim 1, wherein the worst-case power consumption is associated with the turbo operation of the processor and the plurality of information handling resources over a plurality of seconds.

6. The information handling system of claim 1, wherein the worst-case power consumption is associated with a burst operation of the processor and the plurality of information handling resources under 100 milliseconds.

7. A method comprising:
creating an inventory of a plurality of information handling resources integral to an information handling system;
based on the inventory, determining a worst-case maximum power consumption of a processor integral to the information handling system and the plurality of information handling resources;
determining if the worst-case maximum power consumption exceeds a power limit associated with a power subsystem integral to the information handling system; and
if the worst-case maximum power consumption exceeds the power limit, causing a remedial action to be taken to maintain power consumption of the processor and the plurality of information handling resources below the power limit;
wherein the at least one of the plurality of information handling resources comprises a Universal Serial Bus Power Delivery (USB PD) interface; and
the remedial action comprises at least one of:
reducing a power contract associated with the USB PD interface; and
reducing power consumption of the processor;
wherein causing the remedial action to be taken includes preferentially reducing power consumption of the processor responsive to determining that the worst-case maximum power consumption only exceeds a corresponding power limit during a turbo operation of the processor and the plurality of information handling resources over a plurality of seconds.

8. The method of claim 7, wherein the remedial action comprises preferentially reducing power consumption of the USB PD interface responsive to determining the USB PD interface is not in use.

9. The method of claim 8, wherein the remedial action further comprises reducing power consumption of at least one other of the plurality of information handling resources.

10. The method of claim 7, wherein the worst-case power consumption is associated with a continuous operation of the processor and the plurality of information handling resources.

11. The method of claim 7, wherein the worst-case power consumption is associated with the turbo operation of the processor and the plurality of information handling resources over a plurality of seconds.

12. The method of claim 7, wherein the worst-case power consumption is associated with a burst operation of the processor and the plurality of information handling resources under 100 milliseconds.

13. An article of manufacture comprising:
a non-transitory computer-readable medium; and
computer-executable instructions carried on the computer-readable medium, the instructions readable by a processing device, the instructions, when read and executed, for causing the processing device to:
create an inventory of a plurality of information handling resources integral to an information handling system;
based on the inventory, determine a worst-case maximum power consumption of a processor integral to the information handling system and the plurality of information handling resources;
determine if the worst-case maximum power consumption exceeds a power limit associated with a power subsystem integral to the information handling system; and
if the worst-case maximum power consumption exceeds the power limit, cause a remedial action to be taken to maintain power consumption of the processor and the plurality of information handling resources below the power limit;
wherein the at least one of the plurality of information handling resources comprises a Universal Serial Bus Power Delivery (USB PD) interface; and
the remedial action comprises reducing a power contract associated with the USB PD interface; and
reducing power consumption of the processor;
wherein causing the remedial action to be taken includes preferentially reducing power consumption of the processor responsive to determining that the worst-case maximum power consumption only exceeds a corresponding power limit during a turbo operation of the processor and the plurality of information handling resources over a plurality of seconds.

14. The article of claim 13, wherein the remedial action comprises preferentially reducing power consumption of the USB PD interface responsive to determining the USB PD interface is not in use.

15. The article of claim 13, wherein the remedial action further comprises reducing power consumption of at least one other of the plurality of information handling resources.

16. The article of claim 13, wherein the worst-case power consumption is associated with a continuous operation of the processor and the plurality of information handling resources.

17. The article of claim 13, wherein the worst-case power consumption is associated with the turbo operation of the processor and the plurality of information handling resources over a plurality of seconds.

18. The article of claim 13, wherein the worst-case power consumption is associated with a burst operation of the processor and the plurality of information handling resources under 100 milliseconds.

* * * * *